United States Patent
Kapinski et al.

(10) Patent No.: US 11,467,575 B2
(45) Date of Patent: Oct. 11, 2022

(54) SYSTEMS AND METHODS FOR SAFETY-AWARE TRAINING OF AI-BASED CONTROL SYSTEMS

(71) Applicants: TOYOTA MOTOR ENGINEERING & MANUFACTURING NORTH AMERICA, INC., Plano, TX (US); UNIVERSITY OF SOUTHERN CALIFORNIA, Los Angeles, CA (US)

(72) Inventors: James P. Kapinski, Canton, MI (US); Jyotirmoy V. Deshmukh, Torrance, CA (US); Danil Prokhorov, Plano, TX (US)

(73) Assignees: TOYOTA MOTOR ENGINEERING & MANUFACTURING NORTH AMERICA, INC., Plano, TX (US); UNIVERSITY OF SOUTHERN CALIFNORIA, Los Angeles, CA (US)

( * ) Notice: Subject to any disclaimer, the term of this patent is extended or adjusted under 35 U.S.C. 154(b) by 290 days.

(21) Appl. No.: 16/455,360

(22) Filed: Jun. 27, 2019

(65) Prior Publication Data
US 2020/0409359 A1    Dec. 31, 2020

(51) Int. Cl.
*G05D 1/00* (2006.01)
*G06N 3/08* (2006.01)
(Continued)

(52) U.S. Cl.
CPC ......... *G05D 1/0055* (2013.01); *G05D 1/0088* (2013.01); *G06N 3/002* (2013.01);
(Continued)

(58) Field of Classification Search
CPC ............... G05D 1/0055; G05D 1/0088; G05D 2201/0213; G06N 3/084; G06N 3/0445
(Continued)

(56) References Cited

U.S. PATENT DOCUMENTS 10,061,876 B2   8/2018  Mitra
10,095,230 B1  10/2018  Hardin
(Continued)

FOREIGN PATENT DOCUMENTS

WO    2016078715    5/2016

OTHER PUBLICATIONS

De Moura et al., "Satisfiability Modulo Theories: Introduction and Applications", Communications of the ACM, vol. 54, No. 9, Sep. 2011 [hereafter De Moura] (Year: 2011).*
(Continued)

*Primary Examiner* — Tsu-Chang Lee
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for implementing safety-aware artificial intelligence (AI) that can be used for autonomously controlling systems, such as an autonomous vehicle, in a manner that is proven to satisfy given safety constraints. Additionally, a safety-aware training technique can be applied to learned AI-based models, such as neural networks. The safety-aware training techniques can apply automated reasoning tools (ART) while the AI model is trained, in order to produce a model that is provable safe with respect to the safety constraints. The ART can integrate verification into the training process, and thereby dynamically re-train the model based on the safety verification in a feedback loop approach. The ART can be configured to either verify that the AI model is provably safety, or to provide updates to the training parameters used during to re-train the AI model in instances when the safety verification has failed.

13 Claims, 6 Drawing Sheets

(51) Int. Cl.
*G06N 3/00* (2006.01)
*G06N 3/04* (2006.01)
(52) U.S. Cl.
CPC ........... *G06N 3/0409* (2013.01); *G06N 3/082* (2013.01); *G06N 3/084* (2013.01); *G05D 2201/0213* (2013.01); *G06N 3/0445* (2013.01)
(58) Field of Classification Search
USPC .......................................................... 706/25
See application file for complete search history.

(56) References Cited

U.S. PATENT DOCUMENTS

| | | | |
|---|---|---|---|
| 10,102,332 B1 | 10/2018 | Arechiga | |
| 2005/0049990 A1* | 3/2005 | Milenova | G06K 9/6253 706/48 |
| 2016/0253437 A1 | 9/2016 | Platzer | |
| 2019/0310654 A1* | 10/2019 | Halder | G05D 1/0088 |

OTHER PUBLICATIONS

S.G. Nash and A. Sofer. Linear and Nonlinear Programming. Industrial engineering series. McGraw-Hill, 1996.
Abbas et al., "Safe At Any Speed: A Simulation-Based Test Harness for Autonomous Vehicles", Seventh Workshop on Design, Modeling and Evaluation of Cyber Physical Systems (CyPhy'17). Oct. 2017.
Dreossi et al., "Compositional Falsi fication of Cyber-Physical Systems with Machine Learning Components". In: Barrett C., Davies M., Kahsai T. (eds) NASA Formal Methods. NFM 2017. Lecture Notes in Computer Science, vol. 10227. Springer, Cham (2017).
Dreossi et al., "Systematic Testing of Convolutional Neural Networks for Autonomous Driving", Proceedings of the 34th International Conference on Machine Learning, Sydney, Australia, PMLR 70, 2017.
Dutta et al., "Learning and Veri cation of Feedback Control Systems using Feedforward Neural Networks", IFAC-PapersOnLine, vol. 51, Issue 16, 2018, pp. 151-156.
Dutta et al., "Output Range Analysis for Deep Feedforward Neural Networks". In: Dutle A., Muñoz C., Narkawicz A. (eds) NASA Formal Methods. NFM 2018. Lecture Notes in Computer Science, vol. 10811. Springer, Cham (2018).
Dutta et al., "Robust Data-Driven Control of Arti cial Pancreas Systems using Neural Networks". In: Češka M., Šafránek D. (eds) Computational Methods in Systems Biology. CMSB 2018. Lecture Notes in Computer Science, vol. 11095. Springer, Cham.
Ehlers, "Formal Veri fication of Piece-Wise Linear Feed-Forward Neural Networks". In: D'Souza D., Narayan Kumar K. (eds) Automated Technology for Verification and Analysis. Lecture Notes in Computer Science, vol. 10482. Springer, Cham, Sep. 27, 2017.
Geo et al., "dReal: An SMT Solver for Nonlinear Theories over the Reals". In: Bonacina M.P. (eds) Automated Deduction—CADE-24. Lecture Notes in Computer Science, vol. 7898. Springer, Berlin, Heidelberg (2013).
Goodfellow et al., "Deep Learning". The MIT Press, 2016. http://www.deeplearningbook.org.
Katz et al., "Reluplex: An Effecient SMT Solver for Verifying Deep Neural Networks". In: Majumdar R., Kunĉak V. (eds) Computer Aided Verification. Lecture Notes in Computer Science, vol. 10426. Springer, Cham (2017).
Li et al., "Reinforcement Learning With Temporal Logic Rewards". IEEE/RSJ International Conference on Intelligent Robots and Systems (IROS), IEEE, 2017.
Locatelli et al., "Global Optimization: Theory, Algorithms, and Applications". MOS-SIAM Series on Optimization. Society for Industrial and Applied Mathematics, 2013.
Lomuscio et al., "An approach to reachability analysis for feedforward ReLU neural networks". Imperial College London, London, UK, 2017.
Pulina et al., "Challenging SMT solvers to verify neural networks". AI Communications 25 pp. 117-135 (2012).
Sutton et al., "Reinforcement Learning: An Introduction", The MIT Press, Cambridge, Massachusetts, (1998).
Tuncali et al., "Simulation-based Adversarial Test Generation for Autonomous Vehicles with Machine Learning Components". The 2018 29th IEEE Intelligent Vehicles Symposium (IV 2018).
Tuncali et al., "Reasoning about Safety of Learning-Enabled Components in Autonomous Cyberphysical Systems". 55th Annual Design Automation Conference, DAC 2018, San Francisco, CA.
Xu et al., "Robustness of Control Barrier Functions for Safety Critical Control". IFAC-PapersOnLine, vol. 48, Issue 27 (2015) pp. 54-61.

* cited by examiner

SYSTEMS AND METHODS FOR SAFETY-AWARE TRAINING OF AI-BASED CONTROL SYSTEMS

TECHNICAL FIELD

The present disclosure relates generally to artificial neural networks and artificial intelligence (AI) techniques, and in particular, some implementations may relate to improved training for an AI-based controller usable in autonomous systems, such as autonomous vehicle control systems.

DESCRIPTION OF RELATED ART

Cyber-physical systems (CPS) can consist of physical components (e.g., mechanical, electrical, hydraulic, etc.) that are often times tightly integrated with software that controls their operation. Increasingly, CPS applications, such as vehicles (e.g., ground and aerial), robotic manipulators, and medical devices are using AI-based software algorithms to increase their level of autonomy. Such autonomous CPS applications often operate in safety-critical settings, which makes it paramount that the AI-based software being used for control is able to provide guarantees of safe operation for the system.

BRIEF SUMMARY OF THE DISCLOSURE

In accordance with an embodiment of the disclosed technology, a method comprises initiating an iterative training of an artificial intelligence (AI) model based on received initial parameters associated with a safety-aware training of the AI model. The training comprises multiple iterations of calculating weight values for the AI model and the initial parameters comprise at least a safety constraint and a plurality of weight values in accordance with an artificial neural network. The method further involves, at each iteration of training, verifying whether the weight values associated with a current iteration of training satisfy the safety constraint such that the AI model is proven as safe. In accordance with another embodiment, a system comprises a safety-aware artificial intelligence (AI) controller device emulating an AI model of the system. The AI model can be generated using a safety-aware training that is directed towards an objective of safe operations of the system and the safety-aware training integrates verifying the AI model during training with respect to a safety constraint. The system further includes a processor, performing safety-aware and autonomous operations of the system in response to safety-aware controls from the safety-aware artificial intelligence (AI) controller device. In some embodiments, the system may be an autonomous vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide safety-aware AI-based control that is particularly configured to control the autonomous operation of systems in a manner provably safe (with respect to designated safety constraints) at the time of deployment, for example when the system initially operates in its safety-critical environment. Furthermore, the disclosed embodiments provide a safety-aware training technique, where learning and verification with respect to various safety properties is actively integrated into the training of an AI-based computational model, such as a neural network. Accordingly, the disclosed safety-aware training can utilize any safety constraints of the system as a guiding objective applied while an AI model is being trained, thus providing a training procedure that ensures that resulting model provably satisfies all safety constraints.

Figure 1:
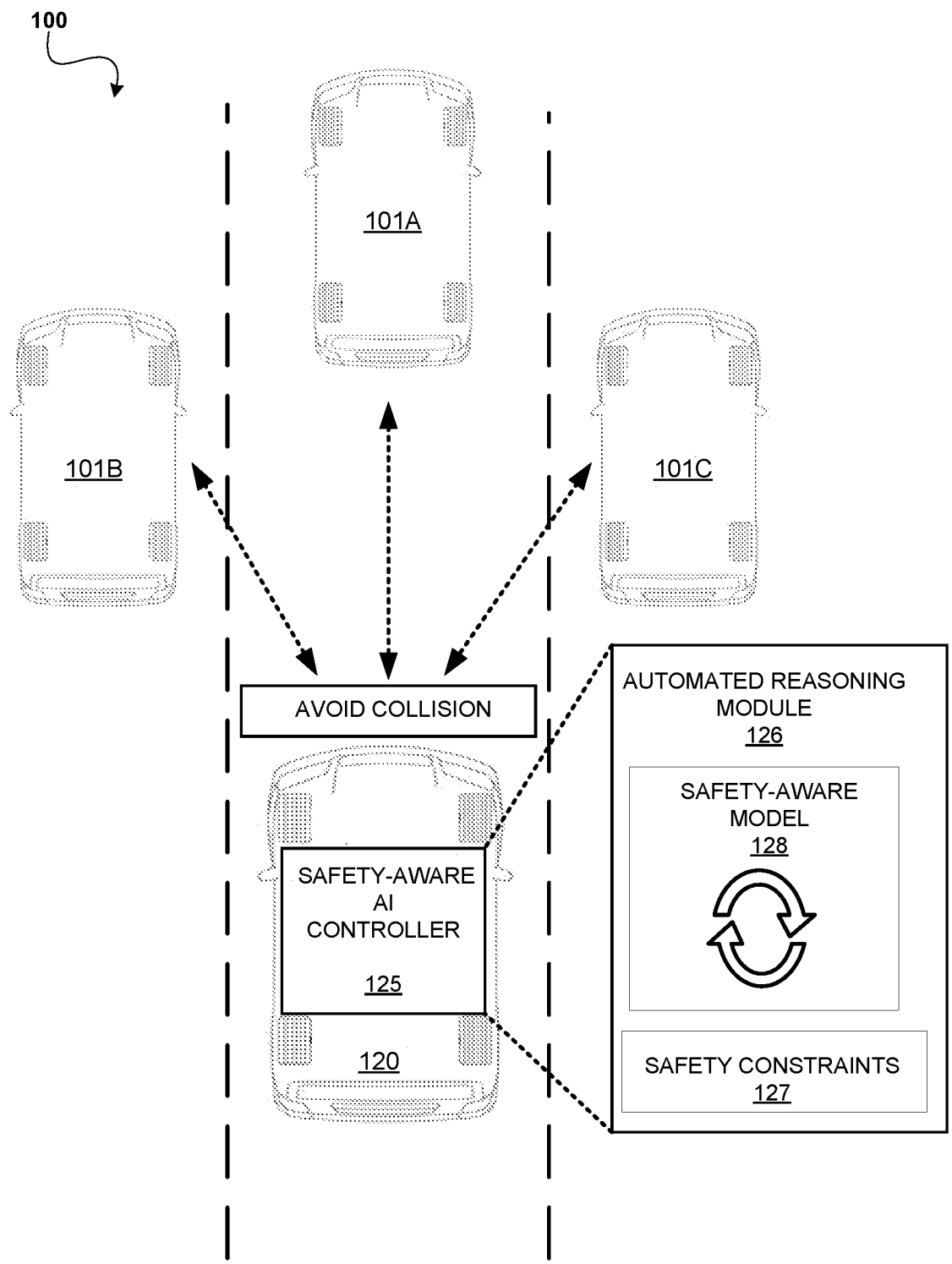
FIG. 1 is an example environment in which artificial intelligence (AI) used for autonomous system operation, as implemented in an autonomous vehicle for example, is implemented with a safety-aware AI controller providing verified safe operation as disclosed herein may be implemented.

FIG. 1 illustrates an example environment 100 in which an autonomous system, shown as autonomous vehicle 120 for example, implements safety-aware AI-based techniques to provide guarantees of safe operation. As referred to herein, a safety constraint can be generally described as quantitative values or characteristic properties that pertain to satisfying various safety factors in the sense of preventing accidents, malfunctions, or unintended functioning, with respect to particular system, application, and operational environment. In an example in the realm of medical devices, a safety constraint can be controlling the device such that the safety constraint of "the system must never harm the patient" is satisfied with some degree of certifiable confidence. The example environment 100 illustrates a real-world application for safety-aware AI techniques that is related to motorized vehicles, shown particularly as automobiles in FIG. 1. As alluded to above, vehicle 120 in the environment 100 has the capability to be autonomously driven. In this case, one or more safety-constraints can be defined that are designed to achieve a desired safety factor for the vehicle 120 during autonomous operations. In the example, the vehicle 120 can be configured to automatically maneuver, or otherwise to be automatically drive-controlled, in a manner that is governed by one or more safety constraints (e.g., target lead/trail distance, target speed, etc.) principally focused to "avoid collision" during operation in its current environment 100, which is illustrated in FIG. 1. The vehicle 120 is shown to include safety-aware AI controller 125, which can implement the disclosed safety-aware AI techniques in semi-autonomous (e.g., partially computer-controlled) or fully autonomous operations for a vehicle. Although the disclosed safety-aware AI techniques are described herein in relation to vehicles, for purposes of illustration, it should be appreciated that these techniques are applicable to various forms of systems and/or elements that may leverage AI-based software for implementing autonomous functionality, such as software applications, robotics, medical devices, and the like.

FIG. 1 generally illustrates a vehicle 120 traveling on a roadway, where vehicle 120 is shown to include the safety-aware AI capabilities implemented by safety-aware AI controller 125. The safety-controller 125 is further shown to include an automated reasoning module 126 comprised of a safety-aware model 128 and storing one or more safety-constraints 127. As referred to herein, AI can be described as an automated computer processes that can intelligently leverage data analysis for training itself for further optimizing the processes. ML can be generally considered an application of AI. AI techniques can include various approaches that are used in the area to achieve automated data analysis, such as neural networks (discussed in greater detail in reference to FIG. 4 and FIG. 5), automated reasoning analysis (e.g., satisfiability modulo theories), and so on. AI-based techniques can be used to enhance computer-controlled features of vehicles in a manner that improves driving safety (e.g., a reduction of potential crashes), provides uniform traffic flow, and optimizes driving performance of vehicles (e.g., fuel efficiency) for a practical application and/or operation environment, for example environment 100.

Also, the vehicle 120 can utilize aspects of AI, such as automated reasoning, to enhance an autonomous self-training process employed for safety-aware AI-driven control. That is, the desired safety specifications for the vehicle 120 are integrated into a training process for the safety-aware model 128 using automated reasoning tools, such as an SMT solver. By applying an SMT solver, for example, the automated reasoning module 126 allows training for the safety-aware model 128 to be specifically guided towards realizing the safety objective, namely "avoid collision" in this example. The automated reasoning module 126 is configured to include verification of the safety-aware model 128 actively while it is trained, with respect to the safety-constraints 127. In some embodiments, an SMT solver implemented by the automated reasoning module 126 is principally configured to: 1) verify that the safety-aware model 128 is safe; or 2) re-train the model 128 using feedback (e.g., adapted training parameters) from the verification. Thus, the automated reasoning module 126 produces a resulting safety-aware model 128 that is provably safe as designed. Even further, as the model 128 has an a priori safety guarantee (from being trained against the safety specifications 127), the safety-aware controller 125 which implements the modeled safety-aware AI system is similarly designed to operate safety. For instance, the controller 125, at the time of deployment, is designed to control autonomous operation of the vehicle 120 in a real-world environment 100 in a manner that satisfies all of the provided safety constraints 127 reliably. Accordingly, as an example, the safety-aware controller 125 can activate one or more automatic actions of vehicle 120, such as engaging a brake, swerving, adjusting speed, and the like, in order to avoid colliding into other vehicles 101A-101C that may be currently sharing the roadway and proximately located to vehicle 120.

In some embodiments, the safety-aware AI capabilities are implemented as an operational mode for vehicle 120. That is, a driver of vehicle 120 may be able to selectively activate or deactivate the safety-aware AI mode as desired. For the purposes of discussion, vehicle 120 is described in reference to FIG. 1 having the safety-aware AI mode activated, thereby enabling it to perform the safety-aware AI control techniques. As used herein, a "vehicle" is any form of motorized transport. In the illustrated example, vehicle 120 and the plurality of nearby vehicles 101A-101C are automobiles. For purposes of illustration, the embodiments will be described here with respect to automobiles. However, it should be appreciated that the safety-aware AI techniques disclosed herein are not limited to automobiles. The systems and methods disclosed herein may be implemented with any of a number of different vehicles and vehicle types. For example, the safety-aware AI systems and methods disclosed herein may be used with automobiles, trucks, motorcycles, boats, recreational vehicles and other like on- or off-road vehicles. In addition, the principals disclosed herein may also extend to other vehicle types as well.

According to an embodiment, vehicle 120 can be an autonomous vehicle. As used herein, "autonomous vehicle" means a vehicle that configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, where each more correspondingly responds to the safety-aware AI controller 125 with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, the safety-aware AI techniques and response can be highly, or fully, automated. For example, the safety-aware AI controller 125 can be configured to communicate controls so as to operate the vehicle 120 autonomously and safely. After the safety-aware AI controller 125 communicates a safety control to the vehicle 120 operating as an autonomous vehicle, the vehicle 120 can automatically perform the necessary adjustments (e.g., accelerating or decelerating) with no human driver interaction. Accordingly, vehicle 120 can operate with respect to the safety constraints 127 in a fully autonomous manner.

Alternatively, or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g. by depressing the brake pedal to reduce the speed of the vehicle), the adaptive cruise control system is deactivated, and the speed of the vehicle is reduced. Thus, with vehicle 120 operating as a semi-autonomous vehicle, the safety-aware AI controlling techniques and response can be partially automated. In an example, the safety-aware AI controller 125 communicates a newly generated (or updated) control to the vehicle 120 operating as a semi-autonomous vehicle, under adaptive cruise control features. The vehicle 120 can automatically perform the some of the necessary adjustments (e.g., accelerating) with no human driver interaction. Alternatively, the vehicle 120 may notify a driver that driver input is necessary in response to a new (or updated) safety control. For instance, upon detecting a safety violation, such as potential collision (e.g., close proximity to another vehicle 101A-101C), vehicle 120 may be reduce the speed to ensure that the driver is travelling cautiously. In response, vehicle 120 can present a notification in its dashboard display that reduced speed is required, because of the safety constraints. The notification allows time for the driver to press the brake pedal and decelerate the vehicle 120 to travel at a speed that is safe.

Figure 2:
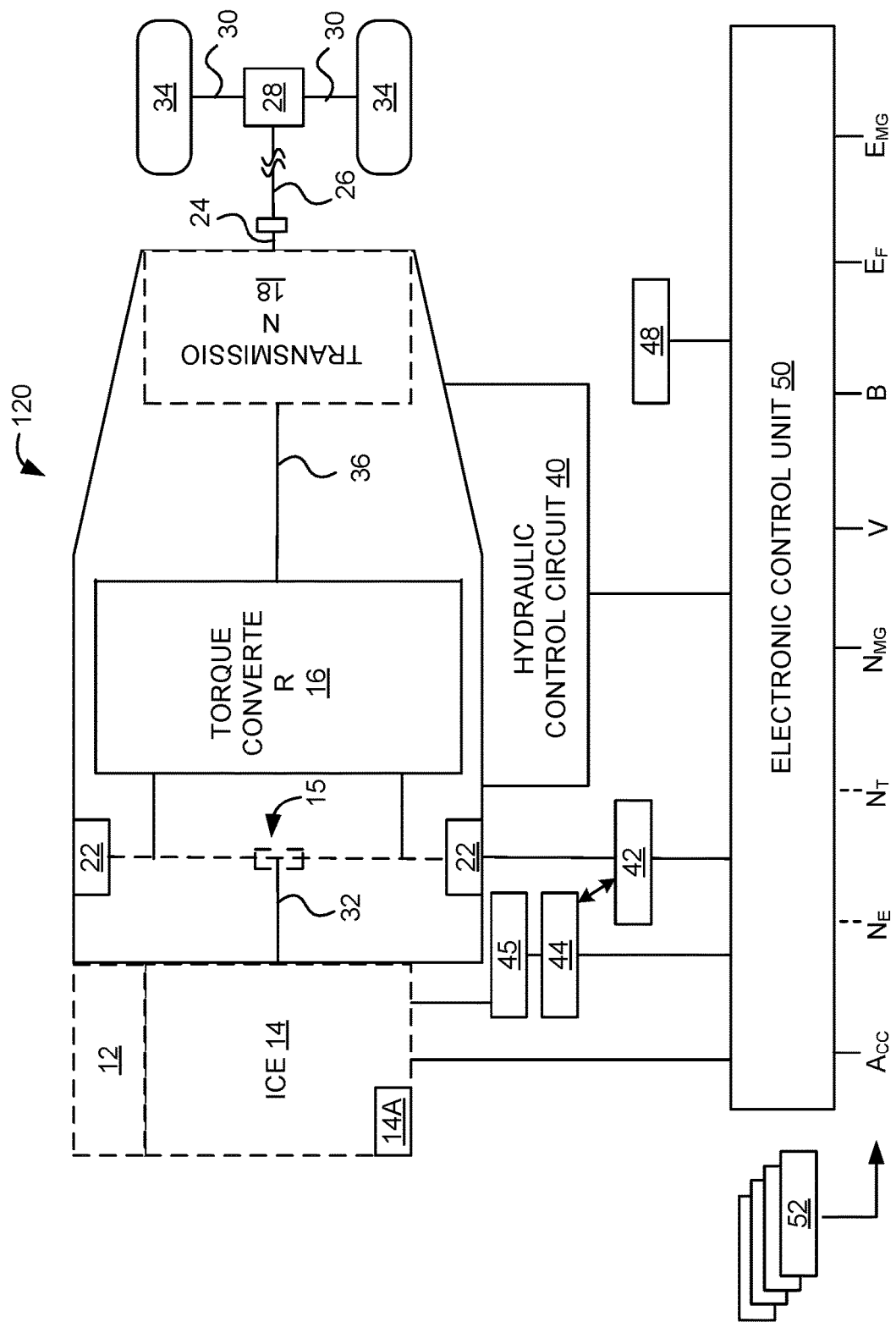
FIG. 2 is a schematic representation of an example vehicle with which embodiments of the safety-aware AI control systems and methods disclosed herein may be implemented.

An example vehicle in which embodiments of the disclosed technology may be implemented is illustrated in FIG. 2. Although the example described with reference to FIG. 2 is a type of vehicle, the systems and methods for safety-aware AI can be implemented in other types of vehicle including gasoline- or diesel-powered vehicles, fuel-cell vehicles, electric vehicles, or other vehicles.

FIG. 2 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 120 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 2, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 3:
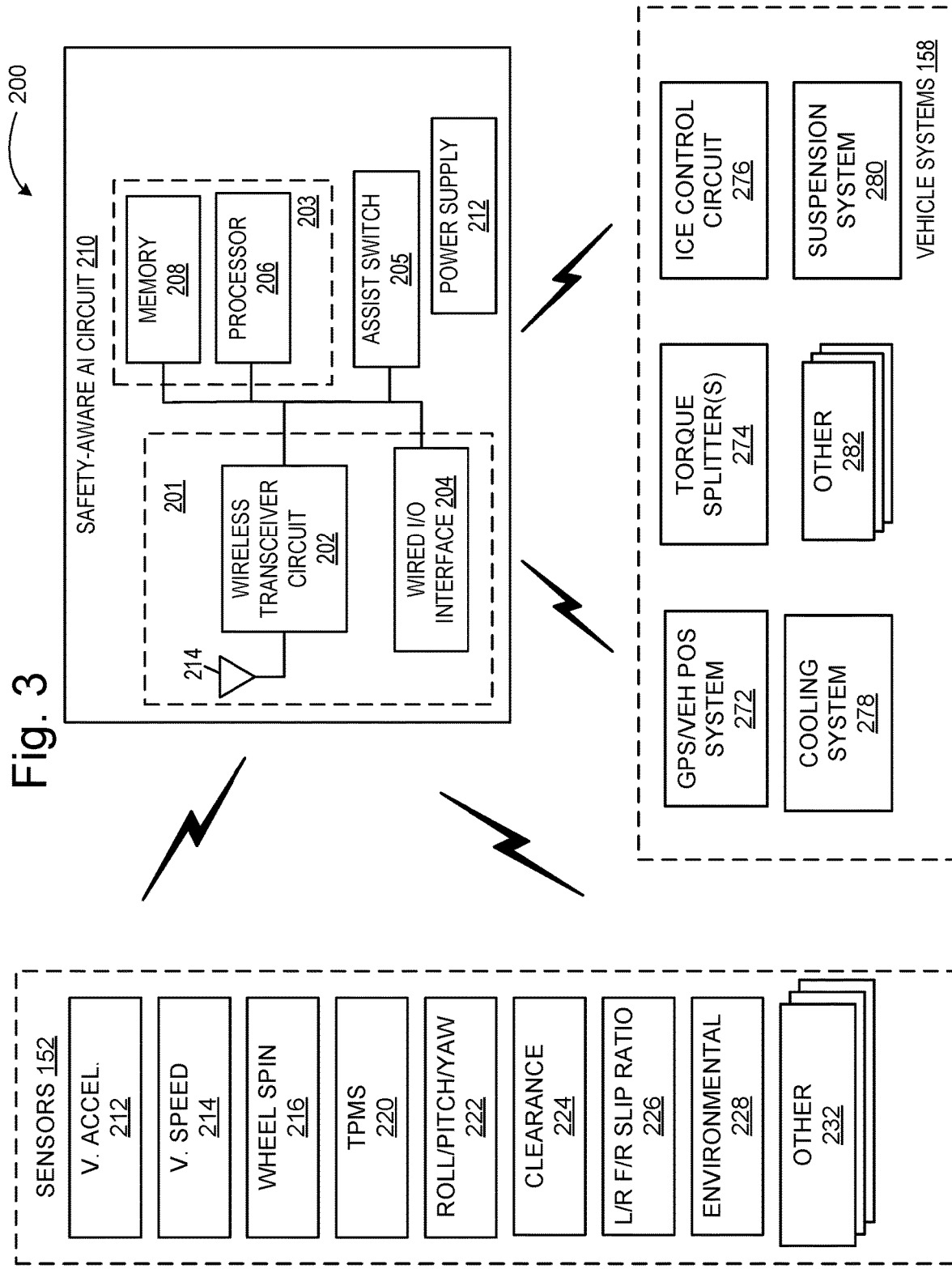
FIG. 3 illustrates an example architecture for a safety-aware AI control mode in accordance with one embodiment of the systems and methods described herein.

FIG. 3 illustrates an example architecture for a safety-aware AI control mode in accordance with one embodiment of the systems and methods described herein. Referring now to FIG. 3, in this example, safety-aware AI control system 200 includes a safety-aware AI circuit 210, a plurality of sensors 152, and a plurality of vehicle systems 158. Sensors 152 and vehicle systems 158 can communicate with safety-aware AI circuit 210 via a wired or wireless communication interface. Although sensors 152 and vehicle systems 158 are depicted as communicating with the safety-aware AI circuit 210, they can also communicate with each other as well as with other vehicle systems. Safety-aware AI circuit 210 can be implemented as an ECU or as part of an ECU such as, for example electronic control unit 50. In other embodiments, safety-aware AI circuit 210 can be implemented independently of the ECU.

Safety-aware AI circuit 210 in this example includes a communication circuit 201, a decision circuit (including a processor 206 and memory 208 in this example) and a power supply 212. Components of the safety-aware AI circuit 210 are illustrated as communicating with each other via a data bus, although other communication in interfaces can be included. Safety-aware AI circuit 210 in this example also includes a switch 205 that can be operated by the user to manually select the mode, enabling the disclosed operations in a vehicle.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to the safety-aware AI circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a safety-aware AI circuit 210.

Communication circuit 201 either or both a wireless transceiver circuit 202 with an associated antenna 214 and a wired I/O interface 204 with an associated hardwired data port (not illustrated). As this example illustrates, communications with safety-aware AI circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by safety-aware AI circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 2. Sensors 152 can include additional sensors that may or not otherwise be included on a standard vehicle with which the safety-aware AI system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of safety-aware AI system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, safety-aware AI circuit 210 can receive information from various vehicle sensors 152 to determine whether a safety control (based on the safety properties for operation) should be enabled. Also, the driver may manually activate a safety-aware AI control mode by operating switch 205. Communication circuit 201 can be used to transmit and receive information between safety-aware AI circuit 210 and sensors 152, and safety-aware AI circuit 210 and vehicle systems 158. Also, sensors 152 may communicate with vehicle systems 158 directly or indirectly (e.g., via communication circuit 201 or otherwise).

Artificial neural networks are a family of technical models based on biological nervous systems, which are used to estimate or approximate functions that depend on a large number of inputs. Neural networks may be represented as a system of interconnected "neurons" which exchange messages between each other. The connections may have numerical weights that can be tuned based on experience, making neural networks adaptive to inputs and capable of machine learning. Artificial neural networks may have a variety of applications, including function approximation, classification, data processing, robotics, and computer numerical control. As previously described, DNNs are a type of artificial neural network that can be used as a computational mechanism for various applications. A model of an DNN is conceptually illustrated in FIG. 4.

Graphically, a DNN as a mathematical construct can be represented as graph 400 of a directed network with nodes 410A-410H (including inputs ($i_j$) 410A-410F, and outputs ($O_j$) 410G-410H), and edges 420A-4200. Edges 420A-4200 can be formed between each of the nodes 410A-410F. A computational "problem" can be encoded (or trained) in the edge weights and a threshold function. Input node values can be delivered to the nodes 410A-410H until the computational "answer" to the problem is determined by a final state for the node values. In this manner, an DNN can be a dynamic system, and the node values can evolve based on the edge weightings to all the other node values (e.g., as a dot product operation). The DNN can be "trained" to a set of distinct inputs. In the illustrated example, the DNN includes a feedforward, fully connected architecture, where there L−1 hidden layers, and the input can be DNN can be assumed to be a vector length No, and the output assumed to be a vector of length $N_L$.

Figure 4:
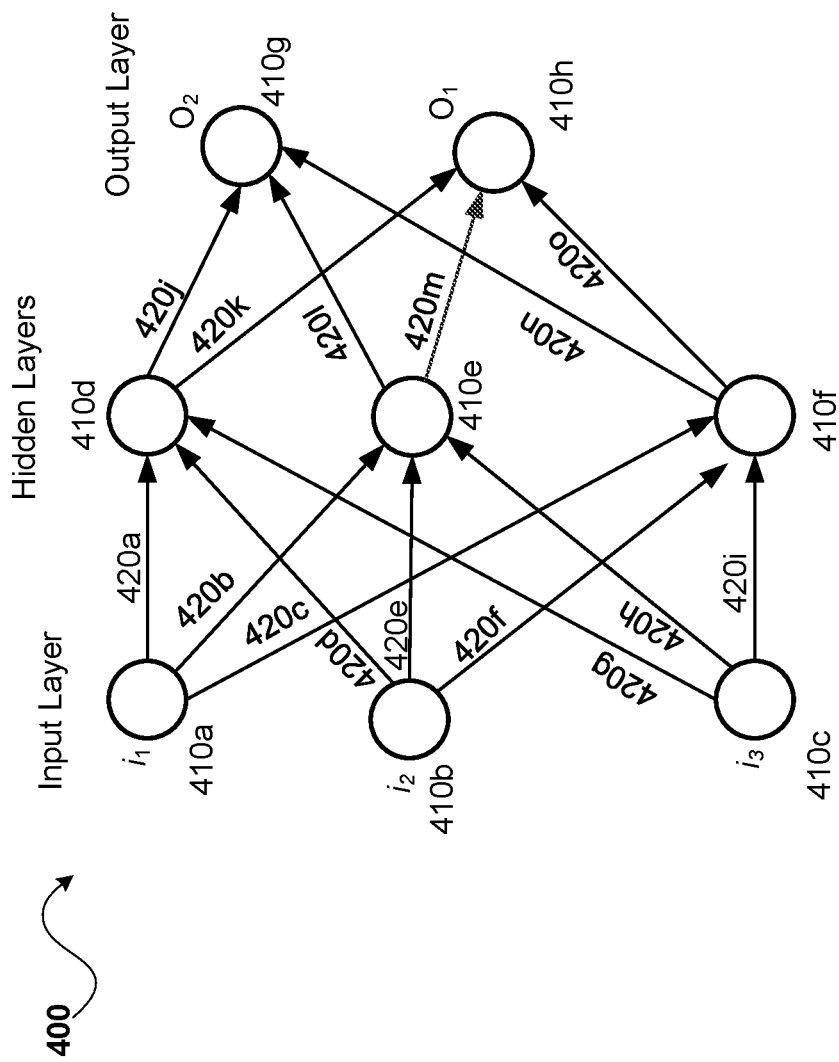
FIG. 4 depicts a conceptual model illustrating an example neural network.
Figure 5:
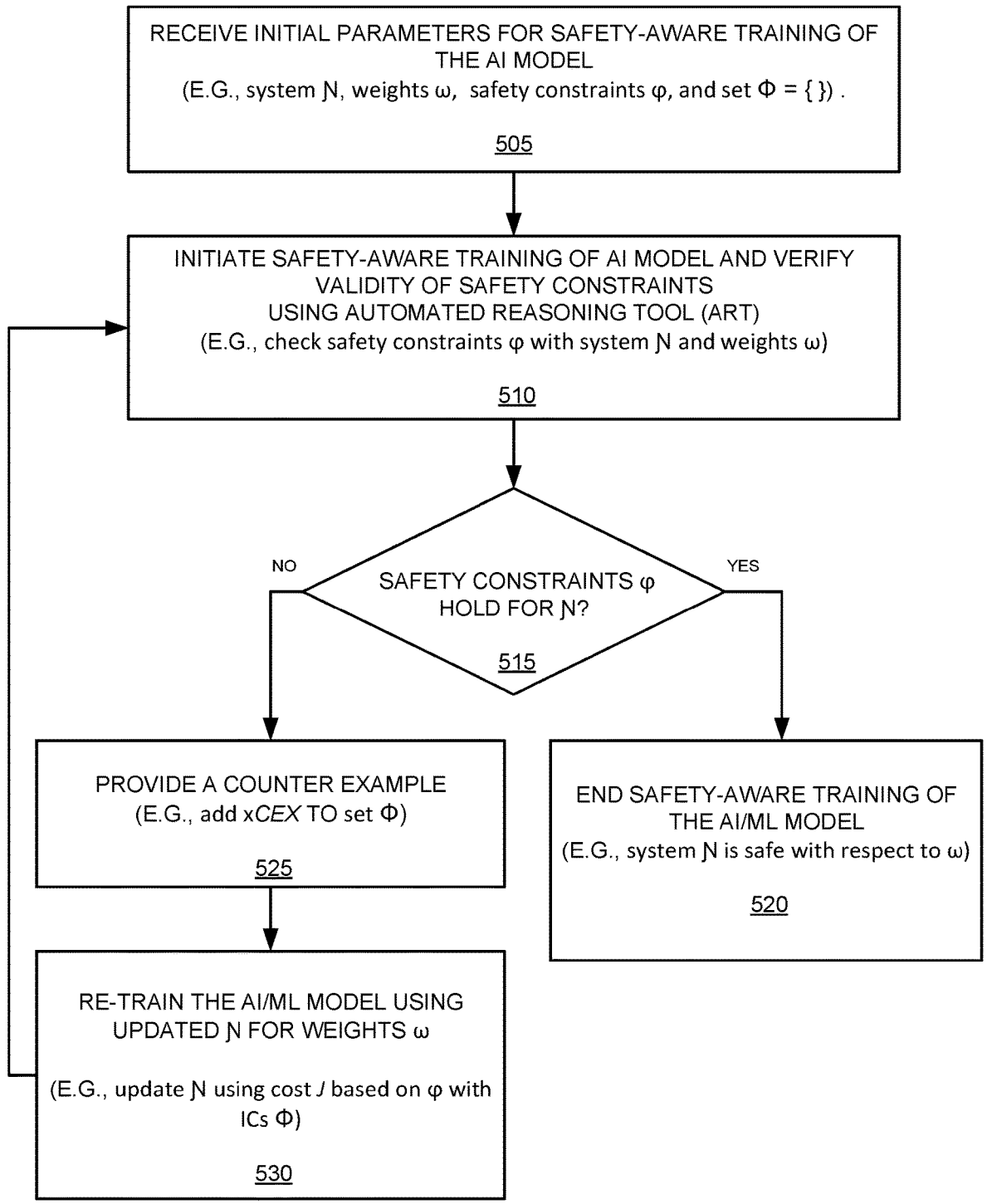
FIG. 5 is a flow chart illustrating example operations for implementing the safety-aware training of an AI model of an autonomous system that may utilize safety-aware AI control techniques, in accordance with one embodiment.

As alluded to above, a safety-aware system can be mathematically modeled, for example being modeled using the neural network approach illustrated in FIG. 4. A modeled neural network, such as a DNN, can then be used as the basis for an AI-based algorithm which implements the disclosed safety-aware AI control operations (as described in detail with reference to FIG. 1). For example, DNNs are often associated with function approximation aspects that are leveraged to complete computations needed to drive AI functions. FIG. 5 illustrates a process that can be employed for modeling a neural network, such as a DNN, using the safety-aware training aspects previously described above. In particular, safety-aware training allows training of the model to be dynamically guided towards being provable safety, which further enables the guaranteed safe model (with respect to designated safety constraints) to appropriately serve as the framework for a safety-aware and AI-controlled system.

Referring now to FIG. 5, a flowchart for an example process 500 is shown for implementing the disclosed safety-aware training techniques. As alluded to above, the process 500 can involve training an AI model, emulating a neural network, that is improved by being directly guided to comply with designated safety constraints. These safety-aware AI models can then be implemented within a system, for instance by an AI-driven controller. Subsequently, an AI-driven controller can be used by a system to implement autonomous and safety-aware operations in accordance with the AI model, for example in the case of the vehicle described above in reference to FIG. 1. As a general description, the process 500 incorporates a priori verification of one or more safety-constraints. The safety-constraints can be parameters that define safety requirements (or characterize safety conditions) which must be met to ensure that the system operates within those boundaries that are deemed as "guaranteed safe." Accordingly, implementing process 500 can result in a system that that all of the given safety constraints are satisfied during operations, such as ensuring collision avoidance for a vehicle operating in autonomous mode. In particular, the process 500 incorporates automated reasoning aspects that enhances the training of the AI over traditional model training techniques, and produces a provably safe system design. Accordingly, the process 500 performs safety-aware training of a neural network models used for automation application, for example. For purposes of illustration, process 500 is described in reference to DNN models.

As illustrated in FIG. 5, process 500 begins at operation 505, where initial parameters for training an AI model are received. In some instances, operations 505 includes providing a parameter associated with the DNN system $N$ to be modeled (as a result of the training). As referred to herein, parameter $N$ can describe the DNN architecture, and further can include aspects relating to the DNN, such as the number of neurons, connections, and type of activation functions. Also, an initial set of weights, or parameter ω, for the system $N$ can be provided as an initial parameter that is received for training during operation 505. The parameter ω, as referred to herein, can be a collection of randomly selected network weights (e.g., initializing DNN weights), or alternatively weights initialized from some previous iteration of the DNN design. Additionally, the initial parameters received at operation 505 can include one or more desired safety constraints, represented hereinafter as parameter φ. Safety constraints φ can be obtained in various forms by process 500. For example, in some cases, the safety constraints φ are received in the form of formalized language to define allowable system behaviors, such as a temporal logic formula. In another example, parameter φ can be a description of a surface in the state space of the system that is required to separate an initial set of system states from a designated set of unsafe system states. Even further, operation 505 can include an initialized set that is used during training, and represented hereinafter as parameter ϕ. Once initialized, the set ϕ can collect a set of initial conditions (ICs) that will be used to define appropriate cost function used to iteratively train the DNN intended to be modeled (i.e., $N$).

Next, proceeding to operation 510, a safety-aware training of the model, in accordance with the embodiments, can be initiated. As a general description, training can be an iterative process, where new values for the neural network can be calculated for a respective iteration, by transforming an input vector in relation to the weights. In this case, the DNN can be thought of as an arbitrary nonlinear function approximator that combines repeated applications of weighted combinations of inputs with nonlinear "activation" functions. The neural network computations that are performed during the iterative training during operation 510 can be represented in the equation below:

$$V_\ell = \sigma(W_\ell V_{\ell-1} + B_\ell) \quad (1)$$

where $\ell - 1$ is the number of hidden layers for the neural network, where $W_\ell$ is a $N_{\ell-1} \times N_\ell$ matrix of weights, $B_\ell$ is ab $N_\ell \times 1$ vector of biases, σ is a function that returns an element-wise application of a nonlinear activation function.

It some cases, it can be assumed that the first iteration involves an untrained model, representative of a set of initial condition states.

Furthermore, an enhancing feature of process 500 can be the application of an automated reasoning tool (ART) during the training of the model in process 510. An ART can be applied, while the AI model is being trained, to check that the required safety constraints of the system are satisfied, or otherwise valid in a state. An ART used in operation 510 can be logic (or a technique) that is deemed suitable for demonstrating validity of assertions related to a problem by providing proofs (e.g., in the form of axioms and interference rules) in an automated manner, for example a satisfiability modulo theories (SMT) solver. It is the integration of an ART into process 500 that is principally yields the improvements of the disclosed safety-aware training over existing AI training technique. As alluded to above, some existing training techniques may include verification aspects. Nonetheless, these tradition verification approaches are restricted to checking validity of the model completely a posteriori, for example after the DNN model is implemented and the resulting system is then observed to violate an intended safety parameter during operation. In contrast, the disclosed safety-aware training techniques, as implemented by process 500 for example, can dynamically re-train a model to be guided towards the specific operational objectives that are defined by the system's safety specifications. In other words, by using an ART, checks for validity of the model (within conditions set by the all of the safety constraints) with respect to safety can be performed concurrently during training, for instance at each iteration. This technique can result in a model that is already provably correct as initially designed, and in turn a yields a system that is guarantee safe as initially designed (as opposed to verifying the model and/or safety of the system after deployment).

FIG. 5 shows that after initially applying the ART during training of the model, a validity check of the model (current iteration of training) in reference to the required safety properties can follow in operation 515, while the model is still actively being trained. At operation 515, if the ART determines that the received safety constraint $\varphi$ holds for system $N$ using weights $\omega$ as result of the check (shown in FIG. 5 as "YES"), then the process 500 can proceed to operation 520. This result can indicate that the ART has successfully verified the satisfiability of the safety constraints $\varphi$ within the current model. Accordingly, at the next operation 520, the safety-aware training of the AI model can end, as it has been proven (in operation 515) that the system $N$ is safe with respect to the received safety constraints $\varphi$, and therefore a related system is guaranteed to satisfy all of the desired safety properties during its operation. In some instances, operation 520 can involve communicating a certificate relating to safety guarantees, for example indicating that the application, such as the ACPS, using the DNN with weights w is safe.

Alternatively, during the check in operation 515, the ART may determine that the safety constraints $\varphi$ do not hold for the system $N$ using the current values calculated for weights $\omega$ (shown in FIG. 5 as "NO"). In these cases, the process 500 moves to operation 525. As a result of the determination that the safety constraints cannot be provable correct, the ART can then provide a counterexample at operation 525, represented by CEX, such as an example that explicitly demonstrates that the safety constraint does not hold (e.g., query to the SMT solver is not true). As illustrated in FIG. 5, operation 525 can involve providing a counterexample point xCEX that is returned by the ART, which is added to the set $\phi$. Note that, in the initial iteration of the process 500, there is no expectation that the initial set of weights $\omega$ will produce provably safe results with respect to the safety constraints.

Next, after the counterexample is provided, the process can move to operation 530 where the AI model is re-trained using the updated set $\phi$. Restated, the process 500 operates in a feedback manner, where results of the validity check can be used to tune parameters applied during training, which in turn, dynamically improves training of the AI by injecting safety-awareness (based on safety verification) during the procedure, such that the training itself is assertively directed towards being provably safe. One the set $\phi$ has been updated, the re-training of the DNN can be performed during operation 530. In this example process 500, re-training involves using a cost function, represented as J, that is used to train the DNN model. The cost function J can be based on the safety constraints $\varphi$ and the set of ICs $\phi$ so that behaviors of a system, starting from any point in $\phi$, that do not satisfy the safety constraint $\varphi$ are penalized. Accordingly, the result of operation 530 can include an updates set of weights w.

FIG. 5 illustrates that process 500 can be characterized as having a sub-routine including operations 510-530 which can be performed iteratively. That is, updated set of weights $\omega$ calculated in operation 530 can be provided to the ART and the process returns to operation 510 in order to perform another validity check based on the re-trained model (having updated parameters from ART). Thus, it can be determined whether the safety constraint $\varphi$ holds in the AI model after the feedback from the ART has been integrated into training. The sub-routine of operations 510-530 can iterate, each time adding new counterexample points to the set $\phi$ until the ART determines that the system $N$ is safe (with respect to the safety constraint $\varphi$) and safety-aware trained AI model is provably correct. In some cases, the process can proceed to operation 520 to end safety-aware training once a certificate of safety is obtained by the ART (e.g., indicating that the design is guaranteed to satisfy at least the received safety constraint $\varphi$ even of the training does not converge).

Figure 6:
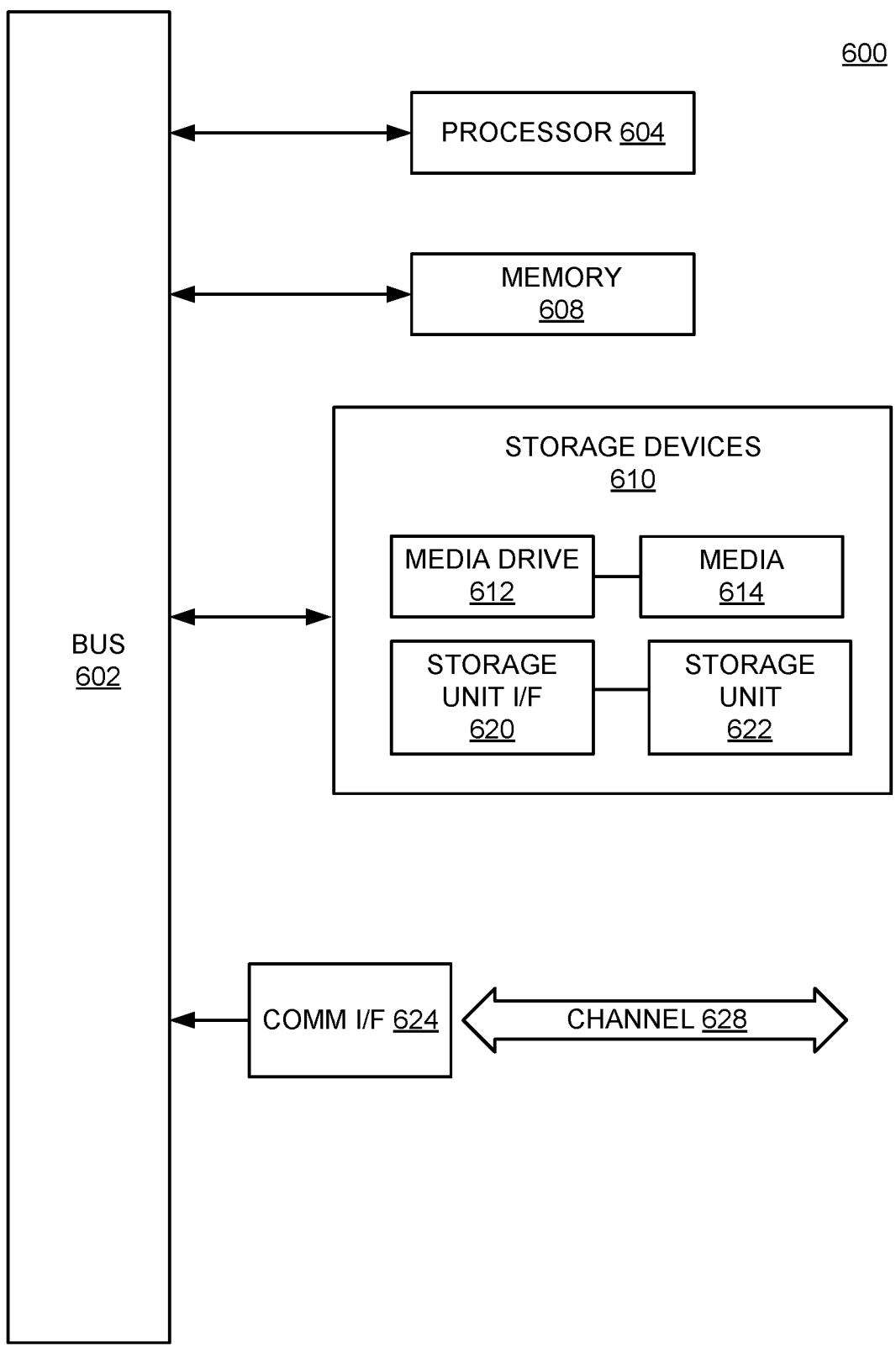
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   initiating, by a controller of an autonomous vehicle, an iterative training of an artificial intelligence (AI) model based on received initial parameters associated with a safety-aware training of the AI model, wherein the training comprises multiple iterations of calculating weight values for the AI model and the initial parameters comprise at least a safety constraint and a plurality of weight values in accordance with an artificial neural network;
   at each iteration of training, verifying, by an automated reasoning tool (ART), whether the weight values associated with a current iteration of training satisfy the safety constraint such that the AI model is proven as safe;
   in response to determining that the weight values associated with the current iteration of training fails to satisfy the safety constraint, generating, by the ART, a counterexample of a safe state associated with the artificial neural network and with respect to the safety constraint; and
   re-training, by the controller of the autonomous vehicle, the AI model using an updated plurality of weight values, wherein the updated plurality of weight values includes the generated counterexamples.

2. The method of claim 1, wherein the ART comprises a Satisfiability Modulo Theories (SMT) solver.

3. The method of claim 1, further comprising:
   in response to determining that the weight values associated with the current iteration of training fails to satisfy the safety constraint, generating, by the ART, counterexamples of a safe state associated with the artificial neural network and with respect to the safety constraint by the ART.

4. The method of claim 3, further comprising:
   updating the initial parameters associated with the AI model based on the counterexamples generated by the ART; and
   providing the updated parameters associated with the AI model as feedback used to re-train the AI model.

5. The method of claim 4, further comprising:
   iteratively re-training the AI model using the updated parameters based on the counterexamples.

6. The method of claim 5, further comprising:
   at each iteration of the re-training, re-verifying whether the re-trained AI model is proven as safe, wherein re-verifying comprises determining whether the updated weight values associated with a current iteration of the re-training satisfy the safety constraint.

7. The method of claim 6, further comprising:
   in response to determining that the updated weight values satisfy the constraint, indicating that the re-trained model is proven safe.

8. The method of claim 7, wherein the re-training comprises using a cost function that penalizes states associated with the artificial neural network that violate the safety constraint.

9. A system comprising:
   an autonomous vehicle;
   a safety-aware artificial intelligence (AI) controller device emulating an AI model of the system, wherein the AI model is generated using a safety-aware training that is directed towards an objective of safe operations of the autonomous vehicle and the safety-aware training integrates verifying the AI model via an automated reasoning tool (ART) during the safety-aware training with respect to a safety constraint, wherein the safety-aware training comprises the ART generating a counterexample of a safe state with respect to the safety constraint and re-training the AI model using the generated counterexamples; and
   a processor performing safety-aware and autonomous operations of the autonomous vehicle in response to safety-aware controls from the safety-aware AI controller device.

10. The system of claim 9, wherein the safety-aware AI controller comprises an automated reasoning module to execute safety-aware training of the AI model towards the objective of safe operations of the system and proving the AI model as safe with respect to the safety-constraint.

11. The system of claim 10, wherein the automated reasoning module further performs:
    receiving initial parameters associated with the safety-aware training of the AI model, wherein the initial parameters comprise at least the safety constraint and a plurality of weight values in accordance with an artificial neural network;
    initiating the safety-aware training of the AI model based on the received initial parameters, wherein the safety-aware training comprises multiple iterations of calculating weight values for the AI model; and
    at each iteration of the safety-aware training, verifying, by the ART, whether the weight values associated with a current iteration of training satisfy the safety constraint such that the AI model is proven as safe.

12. The system of claim 11, wherein the automated reasoning module further performs:
    in response to verifying that the weight values associated with the current iteration of training fails to satisfy the safety constraint, generating counterexamples of a safe state associated with the artificial neural network and with respect to the safety constraint, wherein the counterexamples are provided by the ART and indicate that the safety constraint does not hold.

13. The system of claim 12, wherein the automated reasoning module further performs:

updating the initial parameters associated with the AI model based on the counterexamples; and providing the updated parameters associated with the AI model as feedback used to re-train the AI model during the safety-aware training.

* * * * *